United States Patent
Premm et al.

(10) Patent No.: US 11,557,899 B2
(45) Date of Patent: Jan. 17, 2023

(54) FEEDING ELECTRIC POWER FROM A PHOTOVOLTAIC SYSTEM INTO AN AC SYSTEM HAVING A LOW SHORT-CIRCUIT CAPACITY

(71) Applicant: SMA Solar Technology AG, Niestetal (DE)

(72) Inventors: Daniel Premm, Kaufungen (DE); Vitali Sakschewski, Gundensberg (DE)

(73) Assignee: SMA Solar Technology AG, Niestetal (DE)

(*) Notice: Subject to any disclaimer, the term of this patent is extended or adjusted under 35 U.S.C. 154(b) by 247 days.

(21) Appl. No.: 15/930,666

(22) Filed: May 13, 2020

(65) Prior Publication Data
US 2020/0274459 A1    Aug. 27, 2020

Related U.S. Application Data

(63) Continuation of application No. PCT/EP2018/080346, filed on Nov. 6, 2018.

(30) Foreign Application Priority Data

Nov. 16, 2017   (DE) .................. 10 2017 127 018.3

(51) Int. Cl.
    *H02J 3/16*     (2006.01)
    *H02M 7/44*    (2006.01)
    (Continued)

(52) U.S. Cl.
    CPC .......... *H02J 3/16* (2013.01); *H02J 3/18* (2013.01); *H02J 3/1814* (2013.01); *H02J 3/381* (2013.01);
    (Continued)

(58) Field of Classification Search
    CPC ...... H02M 7/44; H02J 3/16; H02J 3/18; H02J 3/1814; H02J 3/381; H02J 3/48;
    (Continued)

(56) References Cited

U.S. PATENT DOCUMENTS 8,982,590 B2 * 3/2015 Giraut Ruso ........... H02J 3/381
                                                    363/71
9,559,614 B2 * 1/2017 Eberhardt ............. H02M 7/493
(Continued)

FOREIGN PATENT DOCUMENTS

DE    102013106151 A1    1/2014
EP        1906505 A1    4/2008
(Continued)

*Primary Examiner* — Yusef A Ahmed
(74) *Attorney, Agent, or Firm* — Eschweiler & Potashnik, LLC

(57) ABSTRACT

A method and associated apparatus for feeding electric power from a photovoltaic system via a grid connection point into an AC grid having a low short-circuit power is disclosed. The method includes connecting a DC voltage side of at least one first inverter of the photovoltaic system to a photovoltaic generator and an AC voltage side of the at least one first inverter to the grid connection point, wherein the at least one first inverter is operated as a current source, and connecting an AC voltage side of a second inverter of the photovoltaic system to the grid connection point, wherein the second inverter is operated as a voltage source based on measurement values of an AC voltage measured in the region of the photovoltaic system and a predefined characteristic curve. For a first total short-circuit power of all first inverters operated as a current source, and a second total short-circuit power of the AC grid and of the second inverter operated as a voltage source, a ratio of the second total short-circuit power to the first total short-circuit power is greater than or equal to 2.

9 Claims, 2 Drawing Sheets

(51) Int. Cl.
*H02J 3/18* (2006.01)
*H02J 3/38* (2006.01)
*H02J 3/50* (2006.01)
*H02J 3/48* (2006.01)
*H02J 3/40* (2006.01)

(52) U.S. Cl.
CPC ....... *H02J 3/48* (2013.01); *H02J 3/50* (2013.01); *H02M 7/44* (2013.01); *H02J 3/40* (2013.01); *H02J 2300/24* (2020.01)

(58) Field of Classification Search
CPC . H02J 3/50; H02J 3/40; H02J 2300/24; Y02E 10/56; Y02E 40/10; Y02E 40/30
See application file for complete search history.

(56) References Cited

U.S. PATENT DOCUMENTS

| | | | | |
|---|---|---|---|---|
| 9,831,678 B2* | 11/2017 | Premm | ........... | H02M 7/44 |
| 9,906,037 B2* | 2/2018 | Rogers | ........... | H02J 3/381 |
| 10,056,758 B2* | 8/2018 | Unru | ........... | H02J 3/381 |
| 10,298,017 B2* | 5/2019 | Falk | ........... | H02H 7/20 |
| 2003/0039132 A1 | 2/2003 | Engler | | |
| 2009/0236917 A1* | 9/2009 | Bettenwort | ........... | H02J 1/102 |
| | | | | 307/82 |
| 2011/0031813 A1* | 2/2011 | Falk | ........... | H02J 3/381 |
| | | | | 307/77 |
| 2011/0273917 A1* | 11/2011 | Maitra | ........... | H02S 40/32 |
| | | | | 363/74 |
| 2012/0262960 A1* | 10/2012 | Giraut Ruso | ........... | H02J 3/381 |
| | | | | 363/71 |
| 2013/0131878 A1 | 5/2013 | Wilkins | | |
| 2013/0271888 A1* | 10/2013 | Falk | ........... | H02H 3/18 |
| | | | | 361/93.1 |
| 2013/0274946 A1* | 10/2013 | Schelenz | ........... | H02J 3/381 |
| | | | | 700/297 |
| 2014/0015326 A1* | 1/2014 | Eberhardt | ........... | H02M 7/53873 |
| | | | | 307/82 |
| 2014/0191589 A1* | 7/2014 | Friebe | ........... | H01H 9/54 |
| | | | | 307/130 |
| 2014/0204613 A1 | 7/2014 | Blanz | | |
| 2014/0268932 A1* | 9/2014 | Gupta | ........... | H02M 7/53871 |
| | | | | 363/40 |
| 2015/0035366 A1 | 2/2015 | Benesch | | |
| 2015/0115722 A1* | 4/2015 | Fawzy | ........... | H02J 3/18 |
| | | | | 307/82 |
| 2015/0340869 A1* | 11/2015 | Unru | ........... | H02M 7/42 |
| | | | | 307/82 |
| 2015/0380942 A1* | 12/2015 | Premm | ........... | H02M 7/44 |
| | | | | 307/52 |
| 2016/0072292 A1* | 3/2016 | Rogers | ........... | H02J 3/38 |
| | | | | 307/62 |
| 2016/0126739 A1 | 5/2016 | Shi | | |
| 2016/0226256 A1* | 8/2016 | Falk | ........... | H02J 3/466 |
| 2016/0254672 A1* | 9/2016 | Yoscovich | ........... | H02J 3/46 |
| | | | | 307/77 |
| 2017/0163040 A1 | 6/2017 | Bamberger | | |
| 2017/0187186 A1 | 6/2017 | Premm | | |
| 2018/0013288 A1 | 1/2018 | Yang | | |
| 2019/0341776 A1* | 11/2019 | Au | ........... | H02J 3/32 |
| 2019/0386482 A1* | 12/2019 | Mathurai | ........... | H02H 1/0007 |
| 2020/0136383 A1* | 4/2020 | Buchhold | ........... | H02M 7/48 |
| 2020/0136394 A1* | 4/2020 | Buchhold | ........... | H02J 3/383 |
| 2020/0235580 A1* | 7/2020 | McDonnell | ........... | H02J 3/34 |
| 2021/0408796 A1* | 12/2021 | Hermeling | ........... | H02J 3/32 |

FOREIGN PATENT DOCUMENTS

EP           3089310 A1    11/2016
WO      2015025712 A1    2/2015

* cited by examiner

US 11,557,899 B2

FEEDING ELECTRIC POWER FROM A PHOTOVOLTAIC SYSTEM INTO AN AC SYSTEM HAVING A LOW SHORT-CIRCUIT CAPACITY

CROSS REFERENCE TO RELATED APPLICATIONS

This application is a continuation of International Patent Application number PCT/EP2018/080346, filed on Nov. 6, 2018, which claims priority to German Patent Application number 10 2017 127 018.3, filed on Nov. 16, 2017, and is hereby incorporated by reference in its entirety.

FIELD

The disclosure relates to a method for feeding electric power from a photovoltaic system via a grid connection point into an AC grid.

BACKGROUND

When electric power produced on a renewable basis is fed into AC grids in a decentralized manner, problems arise, as is known, as a result of high grid impedances, such as are unavoidable with long connection lines. The high grid impedances have the consequence that the electric power fed in leads to a significant increase in the AC voltage present at the grid connection point. Moreover, fluctuations in the electric power fed in lead to fluctuations in the AC voltage present at the grid connection point. This results in difficulties in stably operating inverters which are used for feeding in the electric power and which are constantly synchronized with the AC voltage. Emergency shutdowns occur in practice, even though the AC grid would be able, in principle, to take up the electric power produced on a renewable basis.

In the case of a wind power system it is known to use so-called STATCOMs and capacitor banks and also synchronous capacitors in order to stabilize the AC voltage at a grid connection point. These are comparatively complex measures.

WO 2013/041534 A2 discloses a method for controlling a photovoltaic system having a photovoltaic generator and an inverter, said photovoltaic system being connected to an AC grid. In that case, electric power comprising positive and negative dynamic control power is transferred between the photovoltaic generator and the AC grid by the inverter depending on a received power control signal. The photovoltaic generator is connected via a DC/DC converter to an input-side DC link circuit of the inverter, to which a battery is furthermore connected via a bidirectional DC/DC converter. With the aid of the battery, positive control power for the AC grid can be provided via the inverter independently of the infeed of electric power from the photovoltaic generator. The battery is charged with electric power from the photovoltaic generator or the AC grid and kept charged until positive control power is required. The electric power buffer-stored in the battery is then fed into the AC grid via the battery inverter and the inverter.

DE 101 40 783 A1 discloses a device for equitable parallel operation of at least two inductively coupled inverters without an additional synchronization and/or communication unit. Each inverter is provided with a control loop intended for closed-loop control of its output voltage, a reference voltage being fed to said control loop as a setpoint voltage, the frequency of said reference voltage being derived from the active power taking account of a preselected frequency droop and the amplitude of said reference voltage being derived from the reactive power taking account of a preselected voltage droop. Active power oscillations between the inverters are avoided by means of a phase feedforward control.

SUMMARY

Feeding comparatively high electric power from a photovoltaic system via a grid connection point into an AC grid having a comparatively low short-circuit power is problematic, particularly if the short-circuit power of the AC grid at the grid connection point is not more than twice the magnitude of the total short-circuit power of all inverters that feed in the electric power of the photovoltaic system at the grid connection point. In other words, if the so-called "short-circuit ratio" (SCR) is less than 2. Difficulties may even already occur if this ratio becomes less than 3. The disclosure addresses the problem by disclosing a method for feeding electric power from a photovoltaic system via a grid connection point into an AC grid and also a corresponding photovoltaic system which operates stably even when the AC grid has a low short-circuit power.

A method according to the disclosure for feeding electric power from a photovoltaic system via a grid connection point into an AC grid having a low short-circuit power is disclosed. At least one first inverter of the photovoltaic system, which is connected to a photovoltaic generator on the DC voltage side and to the grid connection on the AC voltage side, is operated in a customary manner as a current source. A second inverter of the photovoltaic system, which second inverter is connected to the grid connection point, is operated as a voltage source.

The fact that the second inverter of the photovoltaic system, which is connected to the grid connection point, is operated as a voltage source means here that it is operated as a so-called grid former. As a result, the AC voltage detected by all first inverters at their AC voltage terminals is defined jointly by the external AC grid having a low short-circuit power and the second inverter. Therefore, the operation of the first inverters is not adversely affected by the weakness of the AC grid having a low short-circuit power. Rather, said first inverters can be operated as if they were connected to an AC grid having a high short-circuit power, the AC voltage of which cannot be shifted by the first inverters by means of the electric power fed in by the latter such that they themselves or other first inverters are disturbed in their operation.

Specifically, the second inverter of the photovoltaic system can be operated as a voltage source on the basis of measurement values of an AC voltage measured in the region of the photovoltaic system and predefined characteristic curves, also referred to as so-called voltage droops. The measured AC voltage may be, in particular, the AC voltage at the connections of the second inverter that are on the AC voltage side. In other words, the second inverter can be operated autonomously from all first inverters, coordinated operation of a plurality of first inverters not being necessary either. The control of an inverter operated as a voltage source or grid former on the basis of measurement values of an AC voltage and predefined characteristic curves or voltage droops forms, for example, an AC grid with a plurality of inverters connected in parallel.

In the case of the method according to the disclosure, both active power and reactive power can be fed in at the grid connection point by the second inverter. It goes without saying that the second inverter must be configured in a suitable manner for feeding in reactive power as well. However, corresponding inverter designs are known to the person skilled in the art. In one embodiment, a second inverter may be configured in a bidirectional fashion in order to be able to fully fulfill its function as a grid former that stabilizes the AC voltage present at the first inverters by virtue of said second inverter, as necessary, also outputting negative power to the grid connection point, i.e. taking up positive power from there. By contrast, in one embodiment all first inverters of the photovoltaic system according to the disclosure are unidirectional inverters.

The method according to the disclosure may be carried out such that a single second inverter of the photovoltaic system is operated as a voltage source or grid former, while a multiplicity of first inverters connected in parallel are operated in a customary manner as a current source. That is to say that generally a single second inverter suffices for the stabilization of the AC voltage which is present at the first inverters and with which they are synchronized. If there is a need for higher stabilization, however, it is also possible to use a plurality of second inverters. In practice, an adequate number of second inverters may be connected to the connection point until the AC voltage present at the first inverters is sufficiently stabilized.

What may be applicable as a criterion for a sufficient stabilization of the AC voltage present at the first inverters is that a total short-circuit power including the short-circuit powers of the AC grid at the grid connection point and of all grid-forming second inverters, is at least twice the magnitude of a total short-circuit power of all first inverters. In one embodiment this ratio (SCR) is at least 2.5:1, even more preferably at least 3:1. In this case, the respective short-circuit power should be understood to mean the power that results as the product of the maximum short-circuit current from the AC grid or the respective inverter and the AC voltage at the grid connection.

In the case of a photovoltaic system according to the disclosure for carrying out the method according to the disclosure for feeding electric power from the photovoltaic system via a grid connection point into an AC grid having a low short-circuit power, at least one first inverter of the photovoltaic system which is connected to a photovoltaic generator on the DC voltage side and to the grid connection on the AC voltage side is embodied as a current source and a second inverter of the photovoltaic system, which second inverter is connected to the grid connection point is embodied as a voltage source or grid former. In this case, the embodiment as a current source or respectively a voltage source implies that the second inverter, in terms of its electric circuit, is suitable in principle as a current source or respectively a voltage source and that it is also actually operated in this way during the envisaged operation of the photovoltaic system according to one embodiment of the disclosure.

In the case of the photovoltaic system according to the disclosure, the first inverters are connected to the respective photovoltaic generator on the DC voltage side via a respective first DC link circuit having a first link circuit capacitance. The second inverter is connected to a second DC link circuit having a second link circuit capacitance. The second link circuit capacitance is increased, for example, by at least 100%, by at least a factor of 3, or by at least a factor of 5, relative to the first link circuit capacitance in order to make available to the second inverter for a short period the power that is to be fed in by the latter at the grid connection point for the purpose of stabilizing the AC grid, to a sufficient extent such that said second inverter raises the short-circuit power of the AC grid at the grid connection point to the desired level.

In the case of the photovoltaic system according to the disclosure, a photovoltaic generator may likewise be connected to the second DC link circuit on the input side of the second inverter, such that the second inverter also feeds electric power from one of the photovoltaic generators of the photovoltaic system into the AC grid at the grid connection point. In that case, too, the second link circuit capacitance is increased by at least 100% relative to each first link circuit capacitance, in one embodiment.

In order to increase the second link circuit capacitance, as an alternative or in addition to a capacitor having correspondingly large dimensioning, e.g. a supercapacitor and/or a lithium-ion battery may be connected to the second link circuit and, over and above increasing the capacitance, serve(s) as an electrochemical energy storage device.

Even if a further photovoltaic generator is connected, the second DC link circuit on the input side of the second inverter can be charged via the second inverter configured in a bidirectional fashion.

The photovoltaic system according to the disclosure is typically provided for feeding electric power into a three-phase AC grid. Accordingly, in such an embodiment the second inverter is then a three-phase inverter.

As has already been indicated with regard to the method according to the disclosure, many more first inverters than second inverters may be present. Particularly if the second inverter(s) is/are provided for feeding electric power from photovoltaic generators into the AC grid at the grid connection point, the number of said second inverter(s) may be increased by corresponding modification or conversion of first inverters to second inverters until the AC grid present at the grid connection point is sufficiently stabilized. Such stabilization is by virtue of the fact that, for example, the total short-circuit power of the external AC grid at the grid connection point and of the second inverters operated as a voltage source is jointly at least twice, two and a half or three times the magnitude of the total short-circuit power of all first inverters.

Advantageous developments of the disclosure are evident from the patent claims, the description and the drawings. The advantages of features and of combinations of a plurality of features as mentioned in the description are merely by way of example and may take effective alternatively or cumulatively, without the advantages necessarily having to be afforded by embodiments according to the disclosure. Without hereby modifying the subject matter of the accompanying patent claims, the following holds true with regard to the disclosure content of the original application documents and of the patent: further features may be gathered from the drawings—in particular the illustrated geometries and the relative dimensions of a plurality of components with respect to one another and also their relative arrangement and operative connection. The combination of features of different embodiments of the disclosure or of features of different patent claims is likewise possible in a manner deviating from the chosen dependency references in the patent claims and is hereby suggested. This also concerns such features which are illustrated in separate drawings or are mentioned in the description thereof. These features may also be combined with features of different patent claims. Features presented in the patent claims may likewise be omitted for further embodiments of the disclosure.

The features mentioned in the patent claims and the description should be understood with regard to their number such that exactly said number or a greater number than the stated number is present, without the need for explicit use of the adverb "at least". Thus, if one inverter is mentioned, for example, this should be understood to mean that exactly one inverter, two inverters or more inverters are present. These features may be supplemented by other features or be the sole features of which the respective product consists.

The reference signs contained in the patent claims do not restrict the scope of the subjects protected by the patent claims. They merely serve the purpose of making the patent claims more easily understood.

BRIEF DESCRIPTION OF THE FIGURES

The disclosure is explained and described in detail below on the basis of preferred exemplary embodiments illustrated in the figures.

DETAILED DESCRIPTION

Figure 1:
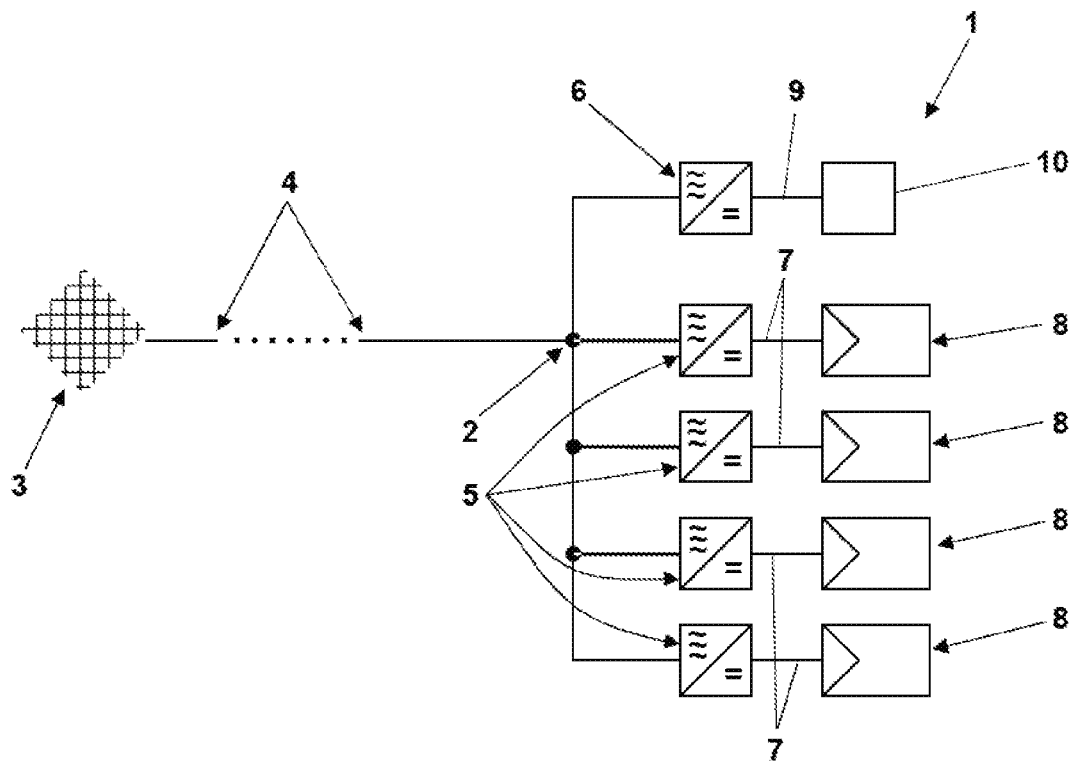
FIG. 1 illustrates a photovoltaic system according to the disclosure in a schematic one-line diagram.

The photovoltaic system 1 illustrated in FIG. 1 serves for feeding electric power via a grid connection point 2 into an external AC grid 3 having a low short-circuit power at the grid connection point 2, in particular on account of a long connection line 4 and correspondingly high line impedances. On account of this low short-circuit power or the underlying line impedances, the electric power fed in from the photovoltaic system 1 at the grid connection point 2 influences very considerably the AC voltage of the AC grid 3 that is present at the grid connection point 2. As a result, the AC voltage at the grid connection point 2 can be shifted relative to the rated voltage of the AC grid 3 to such an extent that stable operation of the photovoltaic system 1 is no longer possible. In particular, there is the risk of emergency shutdown of first inverters 5 of the photovoltaic system 1, which are operated as current sources and are synchronized to the AC voltage at their connections on the AC voltage side, because the increase that they themselves cause in the AC voltage at their connections on the AC voltage side goes beyond a voltage range in which stable operation of the first inverters 5 is possible. For compensation, the photovoltaic system 1 comprises a second inverter 6, which is operated as a voltage source, specifically as a grid former for the local AC grid present at the first inverters 5. Specifically, the effect of operating of the second inverter 6 in parallel with the external AC grid with respect to a local AC grid may be compared to the case of parallel operation of a plurality of grid formers in an island grid, for example. The second inverter 6 stabilizes the AC voltage present at the first inverters 5, which can thus operate without disturbances despite the high line impedances of the connection line 4 and fluctuating electric power fed in from the photovoltaic system 1. A respective photovoltaic generator 8 of the photovoltaic system 1 is connected to input-side DC link circuits 7 of the first inverters 5, such that each of the first inverters 5 feeds in electric power from one of the photovoltaic generators 8 at the grid connection point 2. An energy storage device 10 is connected to an input-side DC link circuit 9 of the second inverter 6. Said energy storage device 10 is embodied such that it can make a high electric power available to the second inverter 6 for a short term in order to feed in said electric power for the stabilization of the AC voltage at the grid connection point 2. This involves the infeed of both active power and reactive power and of both positive power and negative power. Accordingly, in one embodiment the second inverter 6 is configured in a bidirectional fashion, in contrast to the first inverters 5 configured in a unidirectional fashion.

FIG. 1 illustrates the first inverters 5 and the second inverter 6 as connected directly to the grid connection point 2. Especially in the case of large photovoltaic systems, however, regularly at least one transformer stage will be connected between the totality of the inverters 5, 6 and the grid connection point 2. It is also possible for a plurality of transformer stages to be connected in parallel between in each case one or more of the inverters 5, 6 and the grid connection point 2. As a result, there is no change to the fundamental manner of operation and function of the second inverter 6.

Figure 2:
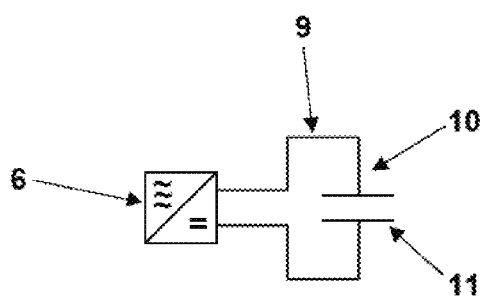
FIG. 2 illustrates a first embodiment of an inverter of the photovoltaic system in accordance with FIG. 1, said inverter being operated as a grid former.

FIG. 2 shows one embodiment of the second inverter 6 in accordance with FIG. 1 and, respectively, of the energy storage device 10 connected thereto. Specifically, in one embodiment the energy storage device 10 is a capacitor 11, which provides the DC link circuit 9 with a high link circuit capacitance. In particular, in one embodiment the link circuit capacitance of the DC link circuit 9 is at least double the magnitude of the link circuit capacitance of each of the input-side DC link circuits 7 of the first inverters 5.

Figure 3:
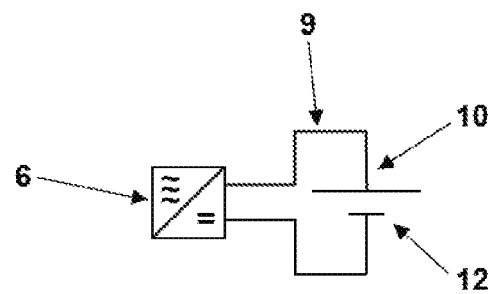
FIG. 3 shows a second embodiment of the inverter operated as a grid former.

In the case of the embodiment of the second inverter 6 and, respectively, of the input-side DC link circuit 9 thereof in accordance with FIG. 3, the energy storage device 10 is a lithium-ion battery 12, which is connected directly to the DC link circuit 9 and thus also increases the link circuit capacitance thereof. The lithium-ion battery 12 is suitable for a multiplicity of charging and discharging cycles. Instead of the lithium-ion battery, an electrochemical capacitor, i.e. a so-called supercapacitor, could also be used, which has a higher power density than the lithium-ion battery 12, which by contrast is distinguished by a higher energy density.

Figure 4:
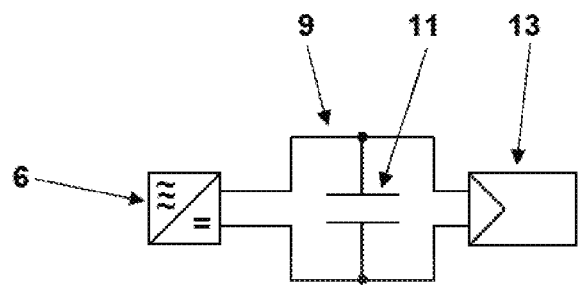
FIG. 4 shows a third embodiment of the inverter operated as a grid former.

In the embodiment of the second inverter 6 in accordance with FIG. 4 at the input-side DC link circuit 9 of said second inverter, a further photovoltaic generator 13 is connected besides the capacitor 11 having larger dimensions or a corresponding capacitor bank. Accordingly, the second inverter 6 in accordance with FIG. 4 also feeds in electric power from the photovoltaic generator 13 at the grid connection point 2 in accordance with FIG. 1. However, the second inverter 6 still differs from the first inverters 5 in accordance with FIG. 1 in that it is not operated as a current source, but rather as a voltage source and grid former, and in that the link circuit capacitance of its DC link circuit 9 is significantly higher than the link circuit capacitance of the DC link circuits 7 of the first inverters 5.

Figure 5:
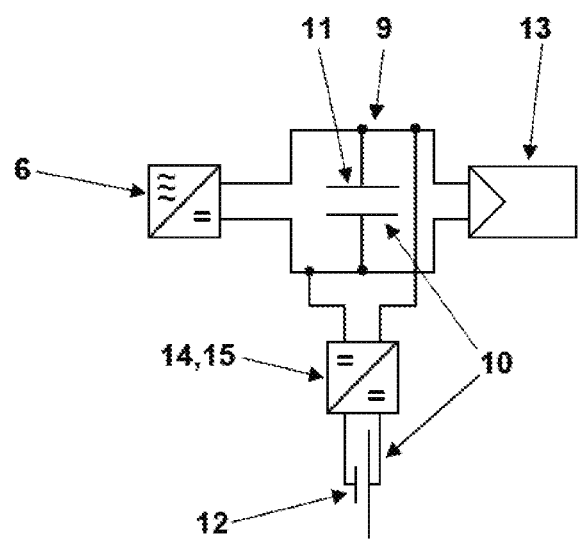
FIG. 5 shows a fourth embodiment of the inverter of the photovoltaic system in accordance with FIG. 1, said inverter being operated as a grid former.

In the embodiment of the second inverter 6 and, respectively, of the DC link circuit 9 thereof in accordance with FIG. 5, in addition to the embodiment in accordance with FIG. 4, a lithium-ion battery 12 is connected via a battery converter 14 in the form of a bidirectional DC/DC converter 15. The energy storage device 10 is thus formed here by the capacitor 11 and the battery 12.

The invention claimed is:

1. A method for feeding electric power from a photovoltaic system via a grid connection point into an AC grid having a low short-circuit power, comprising:
   connecting a DC voltage side of at least one first inverter of the photovoltaic system to a photovoltaic generator and an AC voltage side of the at least one first inverter to the grid connection point, wherein the at least one first inverter is operated as a current source, and
   connecting an AC voltage side of a second inverter of the photovoltaic system to the grid connection point, wherein the second inverter is operated as a voltage source based on measurement values of an AC voltage measured at the photovoltaic system and a voltage droop curve,
   wherein for a first total short-circuit power of all first inverters operated as the current source, and a second total short-circuit power of the AC grid and of the second inverter operated as the voltage source, a ratio of the second total short-circuit power to the first total short-circuit power is greater than or equal to 2,
   wherein active power and reactive power are fed in at the grid connection point by the second inverter,
   wherein the at least one first inverter is connected to the photovoltaic generator on the DC voltage side via a first DC link circuit having a first link circuit capacitance,
   wherein the second inverter is connected on its DC voltage side to a second DC link circuit having a second link circuit capacitance that is greater than the first link circuit capacitance by at least 100%, and
   wherein the second inverter is a bidirectional inverter.

2. The method as claimed in claim 1, wherein the second inverter of the photovoltaic system operated as the voltage source comprises a single second inverter.

3. A photovoltaic system for carrying out the method for feeding electric power from the photovoltaic system via the grid connection point into the AC grid having the low short-circuit power as claimed in claim 1.

4. The photovoltaic system as claimed in claim 3, further comprising at least one of a lithium-ion battery and a super capacitor connected to the second DC link circuit.

5. The photovoltaic system as claimed in claim 4, wherein the AC grid is a three-phase grid and the second inverter is a three-phase inverter.

6. The photovoltaic system as claimed in claim 3, further comprising another photovoltaic generator connected to the second DC link circuit.

7. An inverter system, comprising:
   a first inverter having a DC input terminal configured to connect to a photovoltaic device or other DC power generating device, and having an AC output terminal coupled to a grid connection point terminal, wherein the first inverter is operated as a current source; and
   a second inverter having a DC input terminal configured to connect to an energy store, and an AC output terminal coupled to the grid connection point terminal,
   wherein the second inverter is configured to operate as a voltage source based on one or more measurement values of an AC voltage associated with the grid connection point terminal and a voltage droop curve,
   wherein active power and reactive power are fed in at the grid connection point terminal by the second inverter,
   wherein the first inverter is connected to the photovoltaic device on the DC input terminal via a first DC link circuit having a first link circuit capacitance,
   wherein the second inverter is connected on its DC input terminal to a second DC link circuit having a second link circuit capacitance that is greater than the first link circuit capacitance by at least 100%,
   wherein the second inverter is a bidirectional inverter,
   wherein a first total short-circuit power of the first inverter and a second total short-circuit power of an AC grid and the second inverter is controlled at a predefined ratio range, and
   wherein the predefined ratio range is a ratio of the second total short-circuit power and the first total short-circuit power, and is a ratio of 2:1 or greater.

8. The inverter system of claim 7, wherein the energy store comprises at least one of a lithium-ion battery and a super capacitor connected to the second DC link circuit.

9. The inverter system of claim 7, wherein the energy store comprises another photovoltaic generator connected to the second DC link circuit.

* * * * *